(12) United States Patent
Fellague et al.

(10) Patent No.: US 10,696,123 B2
(45) Date of Patent: Jun. 30, 2020

(54) SYSTEMS FOR A FUEL TANK

(71) Applicant: Ford Global Technologies, LLC, Dearborn, MI (US)

(72) Inventors: Nour-Eddine Fellague, Windsor (CA); Harish Dutt, Canton, MI (US); Peyman Aghssa, Ann Arbor, MI (US); Roberto Jimmy Pellillo, Shelby Township, MI (US); Sean Timothy Ryan, Farmington Hills, MI (US); Sai Gnanarka Gomatham, Farmington Hills, MI (US); Mohammad R. Aghili, Dearborn, MI (US)

(73) Assignee: Ford Global Tehcnologies, LLC, Dearborn, MI (US)

( * ) Notice: Subject to any disclaimer, the term of this patent is extended or adjusted under 35 U.S.C. 154(b) by 164 days.

(21) Appl. No.: 15/904,229

(22) Filed: Feb. 23, 2018

(65) Prior Publication Data

US 2019/0263216 A1   Aug. 29, 2019

(51) Int. Cl.
*B60K 15/07*   (2006.01)
*B60G 21/055*   (2006.01)
*B60G 17/056*   (2006.01)

(52) U.S. Cl.
CPC ....... *B60G 21/0556* (2013.01); *B60G 17/056* (2013.01); *B60K 15/07* (2013.01); *B60G 2204/122* (2013.01); *B60G 2204/128* (2013.01); *B60G 2206/8201* (2013.01)

(58) Field of Classification Search
CPC .. B60K 15/07; B60K 15/067; B60K 15/0675; B60K 15/063; B60K 5/0631; B60K 15/0633; B60K 15/0634; B60K 15/0638
See application file for complete search history.

(56) References Cited

U.S. PATENT DOCUMENTS

| 6,257,360 | B1 | 7/2001 | Wozniak et al. | |
|---|---|---|---|---|
| 6,418,962 | B1 | 7/2002 | Wozniak et al. | |
| 6,905,138 | B2 | 6/2005 | Borroni-Bird et al. | |
| 7,360,621 | B2 | 4/2008 | Komiya | |
| 7,488,017 | B2 | 2/2009 | Lassl et al. | |
| 9,561,765 | B1 * | 2/2017 | Barbat | B60R 19/205 |
| 2005/0200093 | A1 * | 9/2005 | Komiya | B62D 21/11 280/124.109 |
| 2012/0025509 | A1 * | 2/2012 | Hourai | B60K 15/067 280/834 |
| 2012/0192966 | A1 * | 8/2012 | Siebeneick | B60K 15/067 137/376 |
| 2013/0249243 | A1 * | 9/2013 | Lee | B62D 21/152 296/187.03 |
| 2014/0015238 | A1 | 1/2014 | Juettner et al. | |

FOREIGN PATENT DOCUMENTS

DE   2719449 A1   11/1978
DE   10326868 A1   1/2005

* cited by examiner

*Primary Examiner* — Tony H Winner
(74) *Attorney, Agent, or Firm* — Geoffrey Brumbaugh; McCoy Russell LLP (57) ABSTRACT

Methods and systems are provided for a fuel tank and suspension system. In one example, a system may include arranged a dampener between the fuel tank and the suspension system. The dampener may be configured to couple to the fuel tank or suspension system such that a threshold distance between a spud of the fuel tank and a stability bar of the suspension system may be maintained.

20 Claims, 7 Drawing Sheets

SYSTEMS FOR A FUEL TANK

FIELD

The present description relates generally to a dampener arranged at a portion of a fuel tank adjacent to a stability bar of a suspension system.

BACKGROUND/SUMMARY

As vehicle packaging constraints increase, various vehicle components may be arranged closer to one another. Access to these components may become cumbersome and various layouts of vehicle components may present certain deformation conditions. These deformation conditions may include vehicle components contacting and deforming one another, decreasing a structural integrity of the components and introducing one or more structural deformities.

For example, some vehicles may comprise a fuel tank arranged upstream of a suspension system relative to a direction of vehicle travel. The suspension system may comprise a bar arranged between the suspension system and the fuel tank. One such example is shown by Komiya in U.S. Pat. No. 7,360,621. Therein, a fuel tank is arranged upstream of the suspension system. A lateral bar extending between the fuel tank and the suspension system is completely covered with foam. Additionally, longitudinal portions of the suspension system adjacent the lateral bar are similarly covered in foam.

However, the inventors herein have recognized the above issues and other potential issues with such systems. As one example, covering the lateral bar and longitudinal portion of the suspension system with foam is expensive due to the excess of foam. Additionally, application of the foam to these areas may be difficult due to poor access points, thereby increasing a manufacturing cost. Furthermore, a fuel supply pipe of Komiya is arranged at a top portion of the fuel tank. This fails to take advantage of the space between the fuel tank and the suspension system and reduces the overall package efficiency of the vehicle. As such, the vehicle of Komiya may need to comprise more suspension lift, which may decrease handling and increase drag. Furthermore, by including excess foam and arranging the fuel supply pipe above the fuel tank, a volume of the fuel tank may decrease. Thus, a driving range of the vehicle may decrease and a vehicle operator may be forced to perform an increased number of fuel tank fuel fill-ups.

In one example, the issues described above may be addressed by a system comprising a fuel tank arranged upstream of a suspension system relative to a direction of vehicle movement, wherein a stability bar of the suspension system extends in an upstream direction toward a spud of the fuel tank coupled to a pipe, and a foam being coupled to only a portion of the fuel tank where the spud is arranged. In this way, the foam may maintain a distance between the spud and the stability bar.

As one example, stability bar and the suspension system may absorb one or more vehicle forces as a result of driving and/or a vehicle deformation. These forces may move the stability bar toward the fuel tank or vice-versa. However, by arranging the foam between the spud and the stability bar, the threshold distance between the two may be maintained. Therefore, a likelihood of fuel tank degradation due to the stability bar contacting the spud may decrease, decreasing vehicle repair costs and fuel leaks from the fuel tank. Additionally, in some examples, by coupling the foam to a portion of the fuel tank where the spud resides and not other center portions, a manufacturing cost of the vehicle may be reduced compared to arranging the foam in these other portions as well.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-7B are shown approximately to scale.

DETAILED DESCRIPTION

The following description relates to systems for a fuel tank and a suspension system. The fuel tank and suspension system may be utilized in a vehicle, such as the hybrid vehicle of FIG. 1. Previous examples of the fuel tank and the suspension system, where a dampener is not included, are shown in FIGS. 2A, 2B, 3A, and 3B.

Figure 4:
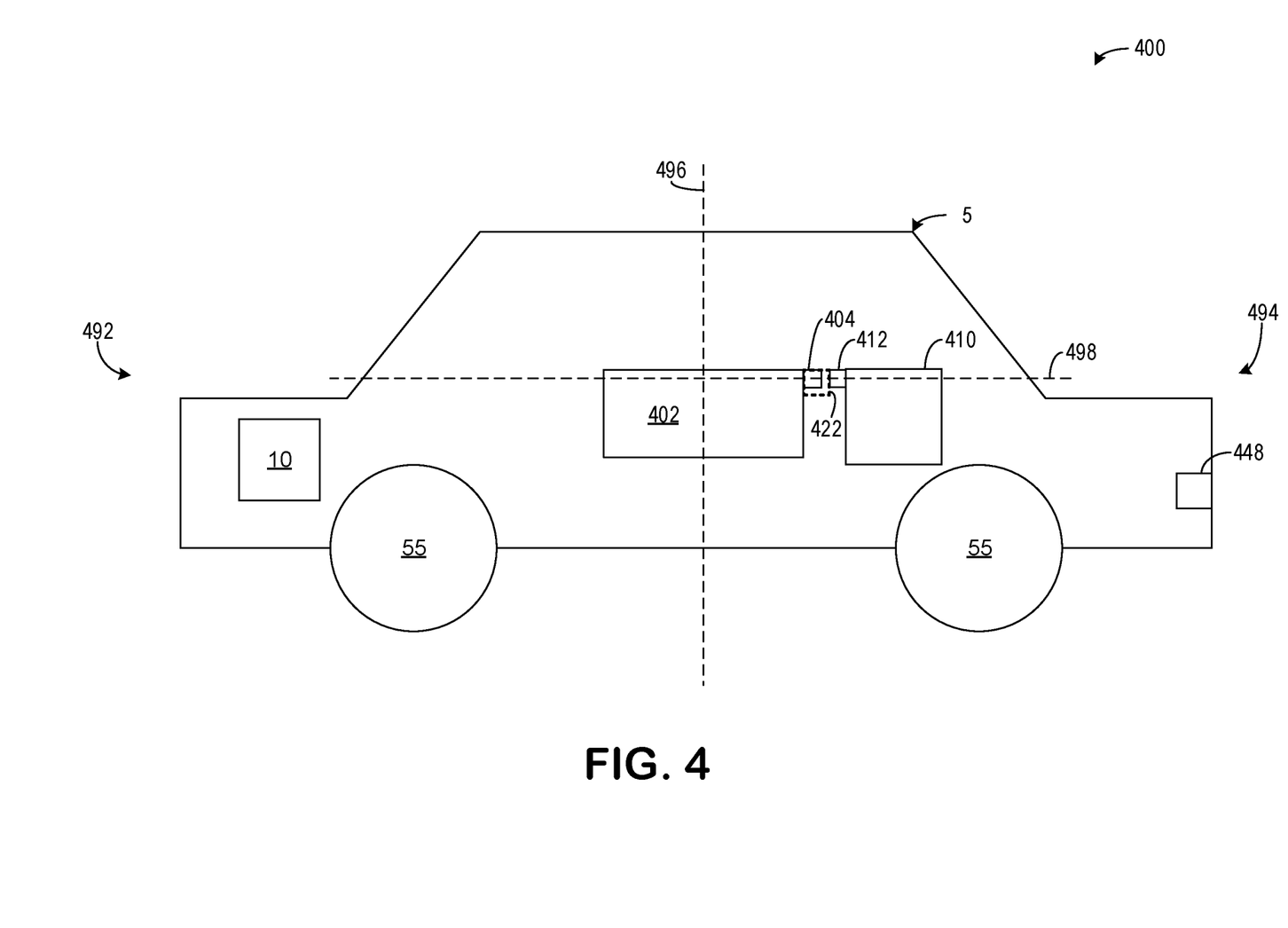
FIG. 4 shows an arrangement of the fuel tank and the suspension system relative to front and rear ends of the vehicle with a dampener arranged therebetween.

The fuel tank and the suspension system may be arranged along an underbody of the vehicle. The fuel tank may be arranged nearer to a front end of the vehicle than the suspension system such that the suspension system is arranged nearer to the rear end of the vehicle than the fuel tank, as shown in FIG. 4. A gap may exist between the fuel tank and the suspension system, where at least one spud of the fuel tank and a stability bar of the suspension system are arranged in the gap. The spud may extend from the fuel tank toward the stability bar. A dampener may be arranged within the gap, the dampener being configured to maintain a threshold distance between the spud and the stability bar.

Figure 5A:
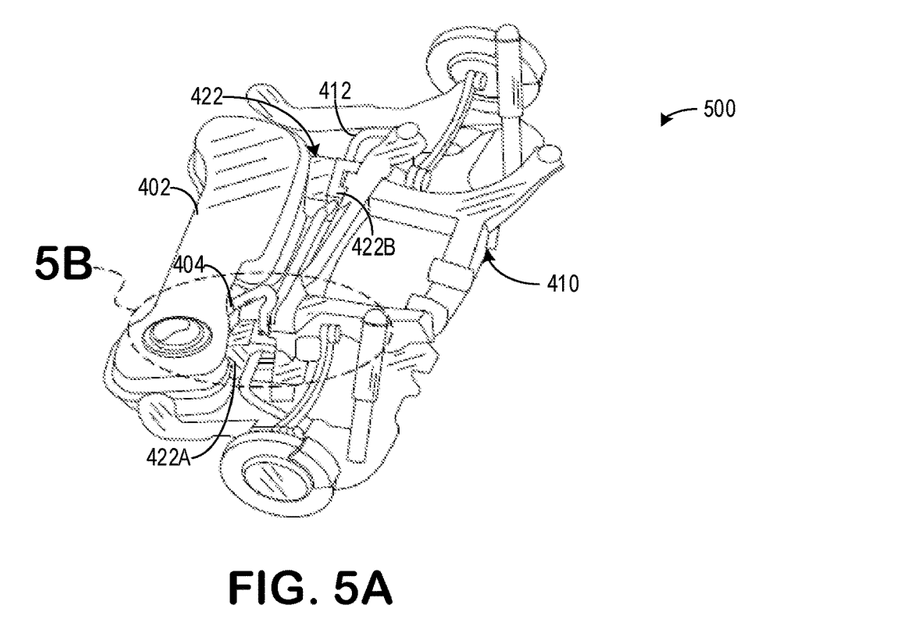
FIGS. 5A and 5B illustrate a first embodiment of the dampener.
Figure 5B:
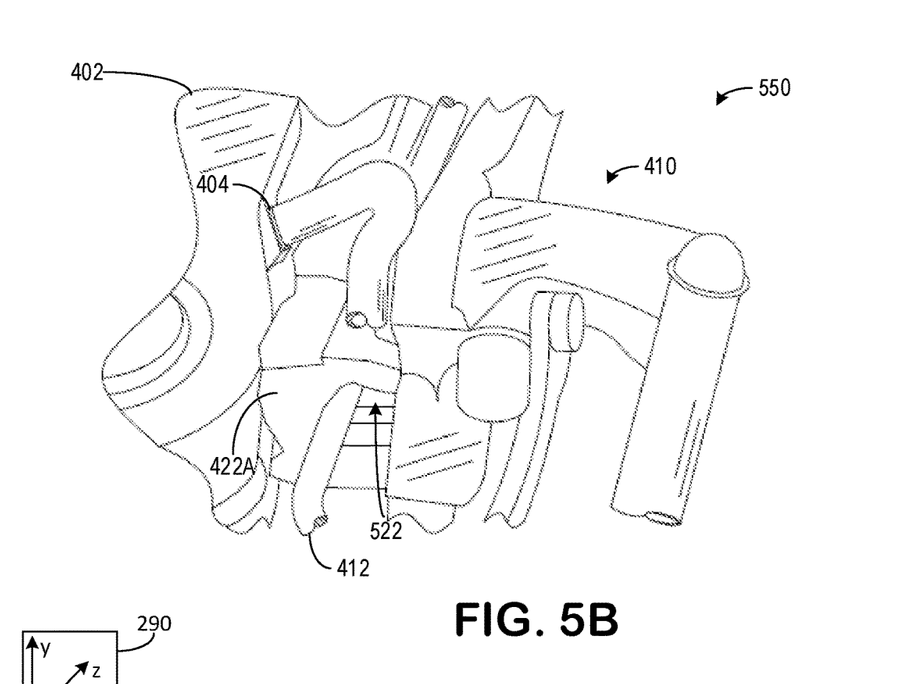

FIGS. 5A and 5B show a first embodiment of the spud wherein the spud is substantially block shaped and arranged at two different portions of the fuel tank. In one example, there is a spud arranged at each of the locations. Additionally or alternatively, a spud is arranged at only one of the locations, wherein the other location is a threshold distance away from the one location.

Figure 6A:
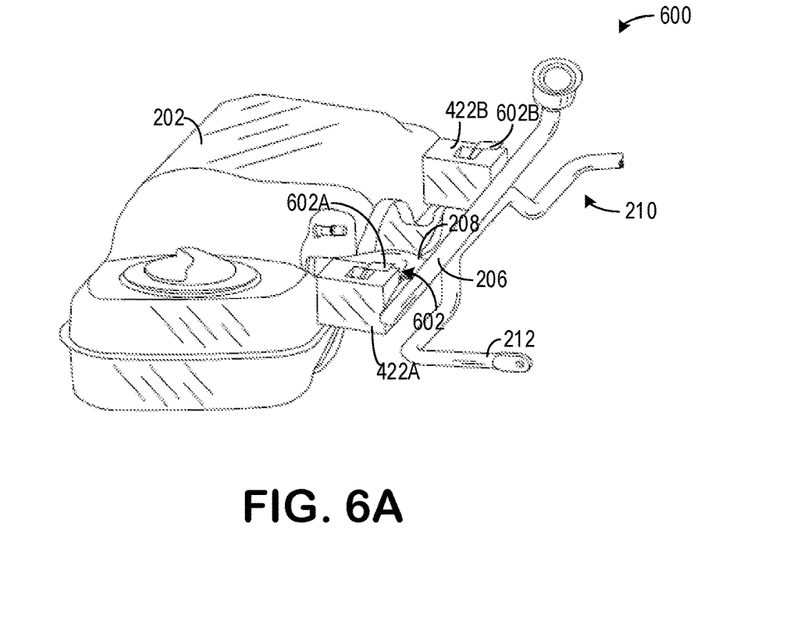
FIG. 6A illustrates a second embodiment of the dampener.
Figure 6B:
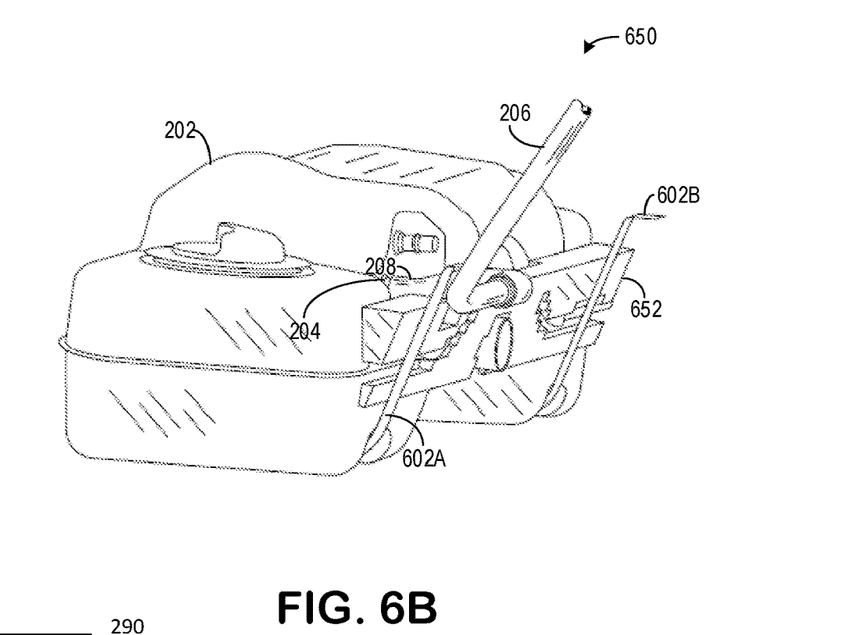
FIG. 6B illustrates a third embodiment of the dampener.

A second embodiment of the dampener is shown in FIG. 6A, wherein the dampener is configured to receive one or more straps of the fuel tank, thereby maintaining a position of the dampener. A third embodiment of the dampener is shown in FIG. 6B, wherein the dampener is configured to couple to a portion of the fuel tank between the fuel tank and the straps. The dampener is a single piece in the example of FIG. 6B, wherein the dampener is arranged only between the outer surface of the fuel tank and the straps.

Figure 7A:
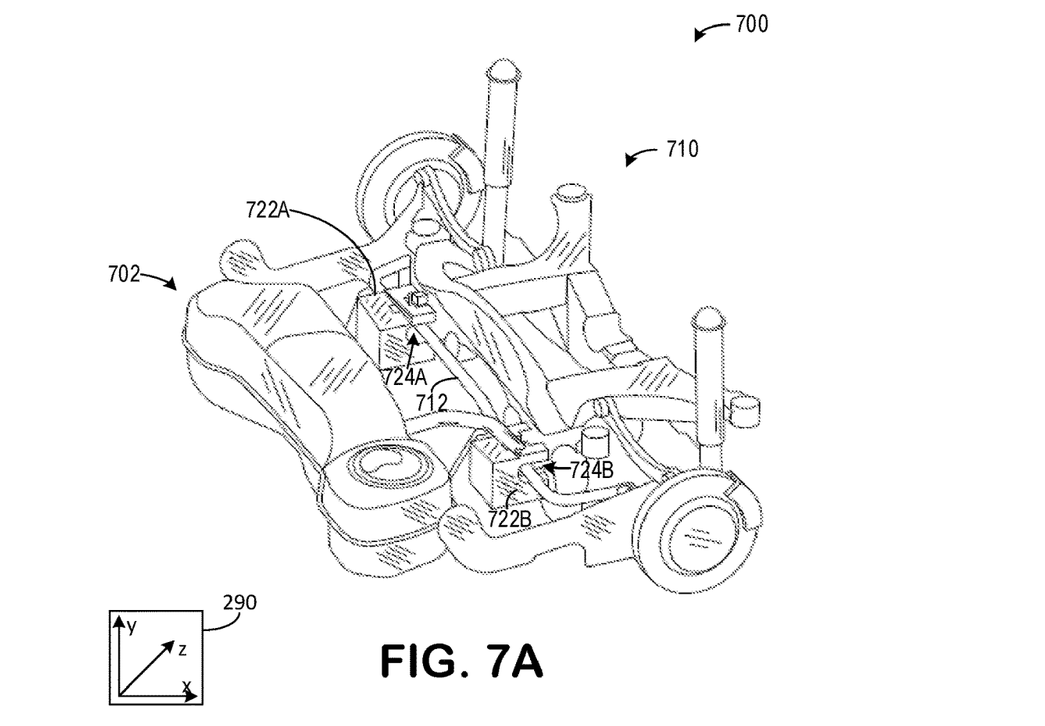
FIGS. 7A and 7B illustrate a fourth embodiment of the dampener.
Figure 7B:
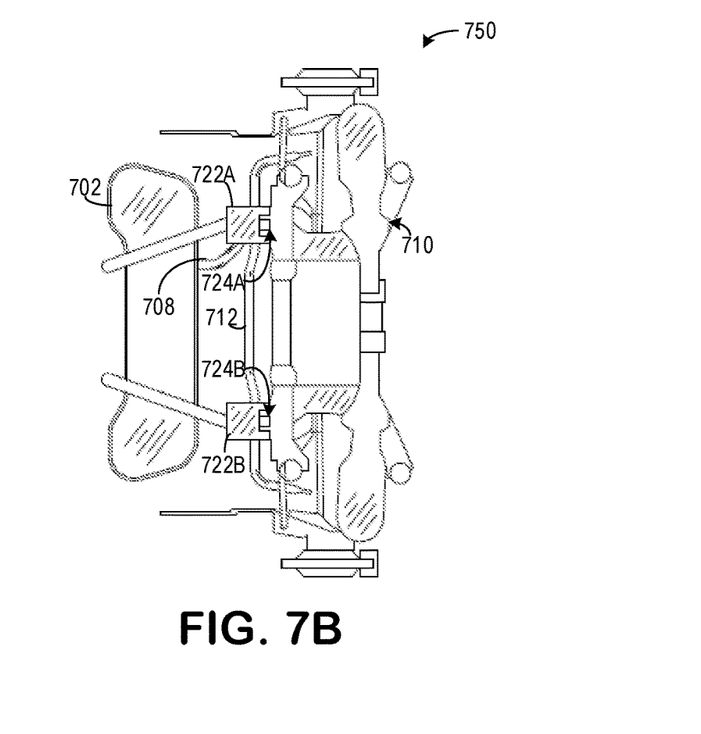

A fourth embodiment is shown in FIGS. 7A and 7B, wherein the at least one dampener is coupled to the suspension system and does not touch the fuel tank. The at least one dampener is configured receive the stability bar such that it may be arranged within cutouts of the dampener.

FIGS. 1-7B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
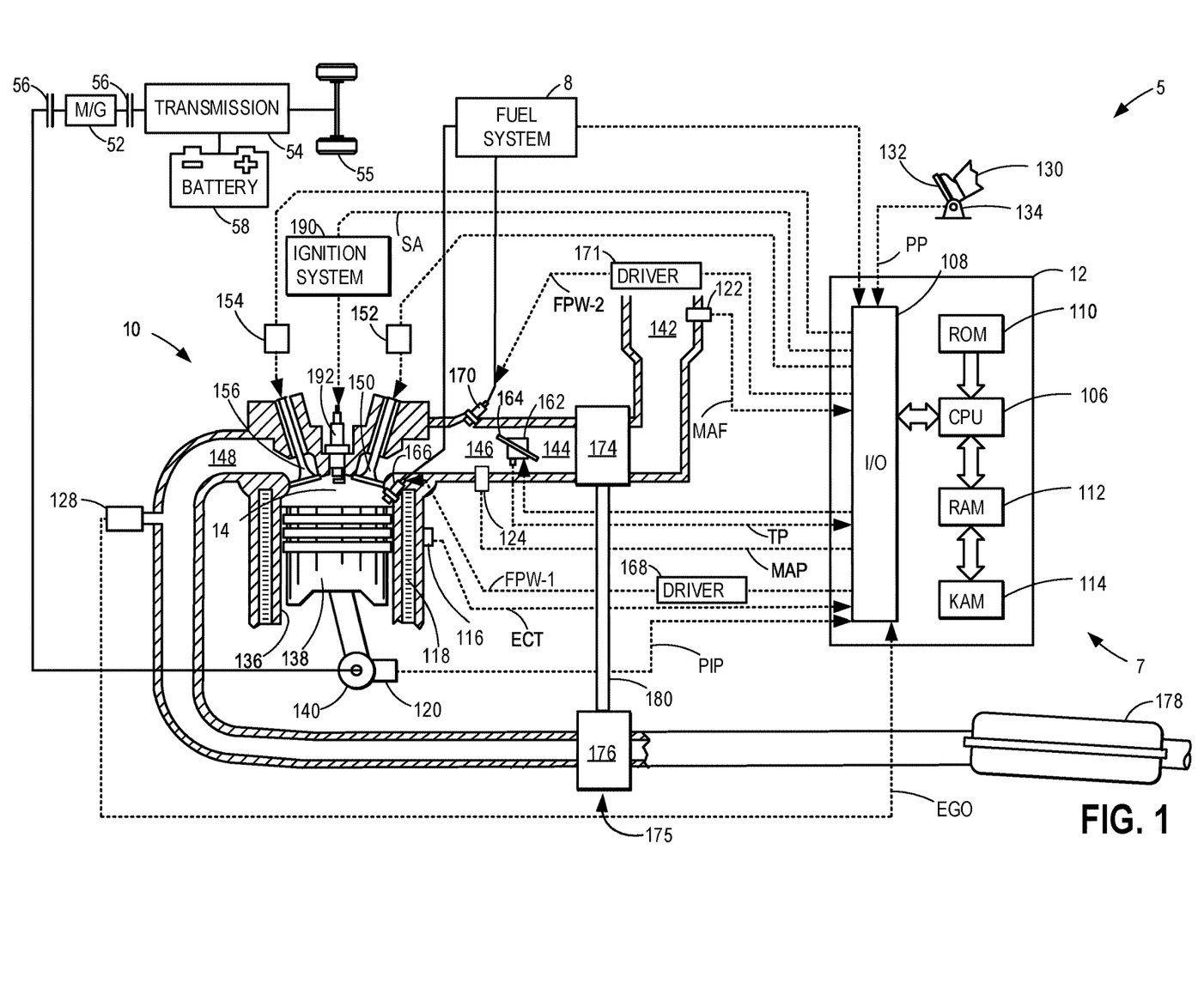
FIG. 1 shows an engine schematic of a hybrid vehicle.

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 1 and employs the various actuators of FIG. 1 to adjust engine operation based on the received signals and instructions stored on a memory of the controller. For example, adjusting a rotational speed and direction of the turbine 176 may include adjusting a signal provided to an actuator of the turbine 176 sent by the controller 12. In some examples, the rotational speed and direction of the turbine 176 are adjusted in response to one or more of a cold-start and pressures of the intake and exhaust passages. Thus, the turbine 176, and therefore the compressor 174, may be rotated in forward and reverse directions, wherein the forward direction results in boost flowing to the engine 10 and where the reverse direction results in increased exhaust backpressure and manifold pressure decreasing.

Figure 2A:
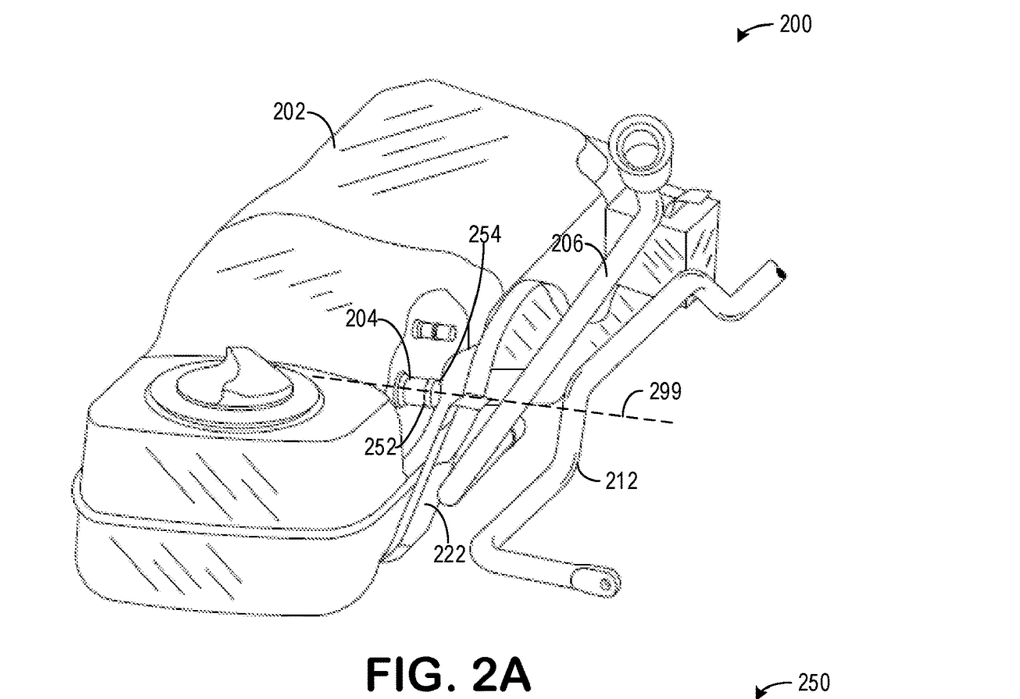
FIGS. 2A and 2B show a relationship between a spud of a fuel tank and a stability bar of a suspension system.
Figure 2B:
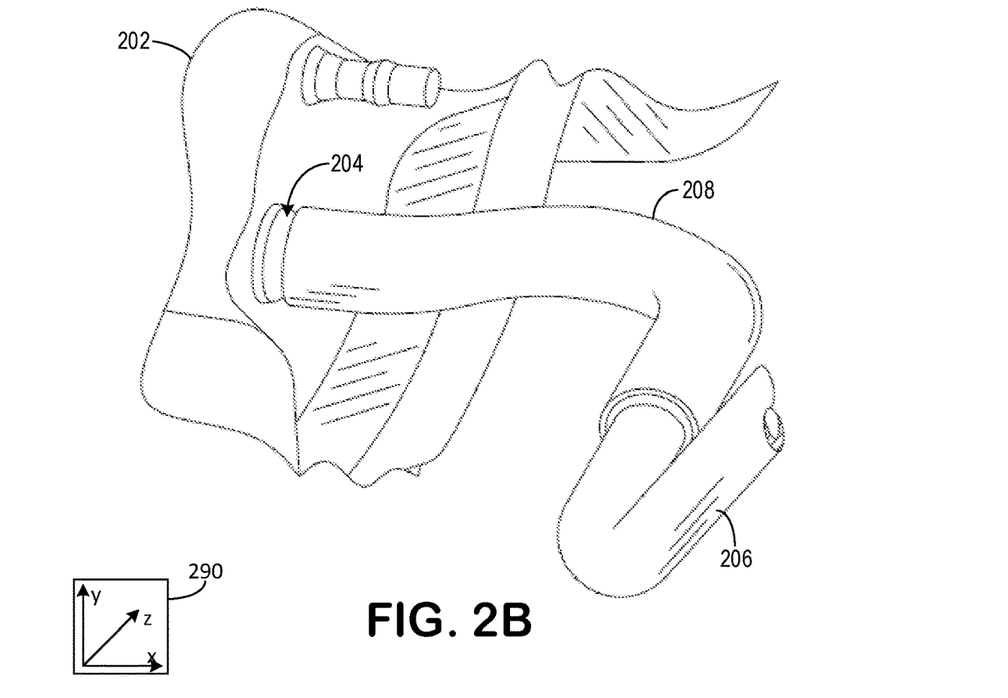

Turning now to FIGS. 2A and 2B, they show a proximity between a spud 204 of a fuel tank 202 and a stability bar 212 of a suspension system 210. Specifically, FIG. 2A shows an embodiment 200 of the fuel tank 202 arranged adjacent the suspension system 210, including various components of the fuel tank 202 and the suspension system 210. FIG. 2B shows an embodiment 250 illustrating a close-up view of the spud 204 and a hose 208. The fuel tank 202 may be part of fuel system 8 of FIG. 1.

An axis system 290 is shown having three axes, namely an x-axis parallel to a horizontal direction, a y-axis parallel to a vertical direction, and a z-axis perpendicular to each of the x- and y-axes. A direction of gravity may be parallel to the y-axis. A horizontal axis of the spud 204 is shown via dashed line 299 (herein, horizontal axis 299). The horizontal axis 299 may be parallel to the x-direction, which may be parallel to a direction of vehicle motion.

Turning now to FIG. 2A, the embodiment 200 illustrates the fuel tank 202 being arranged proximally to the suspension system 210 having the stability bar 212. In some examples, the stability bar 212 may be a stay-bar. The stability bar 212 may reduce a body roll of a vehicle during cornering or over road irregularities. It may connect opposite (left/right) wheels together through short lever arms linked by a torsion spring. The stability bar can be located towards the front or to the rear of the rear subframe. In either of these conditions, the stability bar may collide with a fuel tank arranged directly across the stability bar, which may lead to degradation of the fuel tank.

The suspension system 210 may couple one or more of tires (e.g., wheels 55 of FIG. 1), springs, shock absorbers, and other linkages that connect the vehicle (e.g., vehicle 5 of FIG. 1) to its wheels and allows relative motion between the two. As such, the fuel tank 202 and the suspension system 210 may be used in the vehicle 5 of FIG. 1.

The suspension system 210 may be tuned to a specific stiffness, wherein the stiffness adjusts performance and ride quality. For example, vehicles with a more stiff suspension may experience increased handling. However, this may also result in decreased ride quality, which may include a vehicle operator feeling more of the road. For example, a vehicle comprising a more stiff suspension may rattle and/or vibrate more than a similar vehicle comprising a less stiff suspension. As another example, for two vehicles passing over an identical speed hump, a first vehicle comprising a more stiff suspension and a second vehicle comprising a less stiff suspension, a vehicle operator of the first vehicle may feel the speed hump more than a vehicle operator of the second vehicle, wherein feeling the speed hump may be directly proportional to an amount the vehicle operator moves as a result of the speed hump. Thus, a more stiff suspension may absorb less force (e.g., energy) than a less stiff suspension, resulting in greater movement of a vehicle and passengers arranged therein.

A potential drawback of a less stiff suspension may include oscillations from their starting positions. That is to say, the less stiff suspension may move more than a more stiff suspension in response to receiving forces from the wheels. This movement may result in portions of the suspension colliding with various other nearby components of the vehicle. One such example may include the stability bar 212 colliding with or otherwise impact and contact a spud 204 or component extending therefrom (e.g., a hose 208 or pipe 206). The stability bar 212 may collide with components of the fuel tank 202 in response to road conditions and/or a vehicle collision. As an example, if the vehicle is rear-ended (e.g., hit at a rear extreme end where a tailpipe and rear bumper may be located), then the stability bar 212 may collide with one or more components of the fuel tank 202, which may result in degradation of the fuel tank (e.g., dent, crack, puncture, and the like).

The fuel tank 202 may comprise only one of the spud 204. The spud 204 may be arranged adjacent to a strap 222 of the fuel tank. The strap 222 may be used to hold the fuel tank 202 in place. In some examples, the strap 222 may be a first strap, wherein a second strap is arranged at an opposite end of the fuel tank. The first and second straps may both be arranged on a side of the fuel tank facing the stability bar (e.g., stability bar 212 of FIG. 2A).

Turning now to FIG. 2B, the embodiment 250 shows a hose 208 extending from the spud 204 to the pipe 206. In one example, the pipe 206 is a fuel supply pipe. The pipe 206 extends from a surface of the fuel tank 202 facing a gap between the fuel tank 202 and the suspension system 210, the pipe 206 extending between the fuel tank 202 and the stability bar 212 of the suspension system 210. The hose 208 may be a single, contiguous piece wrapping around the spud 204. The hose 208 may comprise one or more of rubber, plastic, Kevlar, and the like. Additionally or alternatively, the hose 208 may comprise a woven material such as steel, carbon fiber, magnesium, and other similar materials. The hose 208 may twist, bend, curve, and/or flex as it extends from the spud 204 to the pipe 206.

The spud 204 may be substantially cylindrical in shape. A cross-section of the spud 204 taken along an axis perpendicular to horizontal axis 299 of the spud 204 may be substantially circular. The spud 204 may extend in a direction parallel to the horizontal axis 299. The spud 204 is physically coupled to an outer shell of the fuel tank 202 via one or more of welds, adhesives, fusions, and fasteners. In some examples, the outer shell may comprise an opening associated with a location of the spud 204 such that liquid or gas may pass through the spud 204 and into the fuel tank 202. Additionally or alternatively, liquid or gas may pass from the fuel tank 202, through the spud 204, and into the hose 208.

A flange 252 of the spud 204 may be inserted into the hose 208. The flange 252 may be chamfered to mitigate a likelihood of the hose 208 dislodging from the spud 204. The flange 252 may increase in thickness in a direction toward the fuel tank 202, wherein the flange 252 may be terminated at a right angle relative to the horizontal axis 299 and a surface of the spud 204. In this way, the flange 252 may present a resistance to the hose 208 when the hose 208 is moved in a direction away from the fuel tank 202. Said another way, the flange 252 may reduce inadvertent disconnection of the hose 208 from the spud 204.

An interface between the spud 204 and the hose 208 may present some issues in the embodiments 200 and 250 of FIGS. 2A and 2B. As described above, a suspension system, which may be the suspension system arranged in mass production vehicles, may move in response to one or more of road conditions and a vehicle collision. This movement may result in a collision between the suspension system and a component of the fuel tank 202.

As illustrated above in the embodiment of FIG. 2A, the pipe 206 is adjacent the stability bar 212 of the suspension system 210. Movement of the stability bar 212 may result in movement of the pipe 206 due to contact between the two. The hose 208 may also move if the pipe 206 moves. This may adjust the interface between the spud 204 and the hose 208 such that a rim 254 spud 204 may press against an interior surface of the hose 208. Due to the chamfer of the flange 252, the rim 254 may be pointed such that the rim 254 is sharp relative to other surfaces of the spud 204. If the hose 208 becomes degraded (e.g., torn), then fuel may leak from one or more of the hose 208 and the spud 204.

Additionally or alternatively, impact between stability bar 212 and the pipe 206 may result in the spud 204 pressing through the outer shell of the fuel tank 202. This may degrade the fuel tank 202, resulting one or more of spilled liquid fuel and the release of fuel vapors. Additionally or alternatively, the stability bar 212 may collide directly with the spud 204, wherein the collision may result in a physically coupling between the spud 204 and the fuel tank degrading. At any rate, degradation of the fuel tank 202 and/or the hose 208 during a collision may be undesired. A dampening device for preventing such a collision and/or interaction is described below.

Figure 3A:
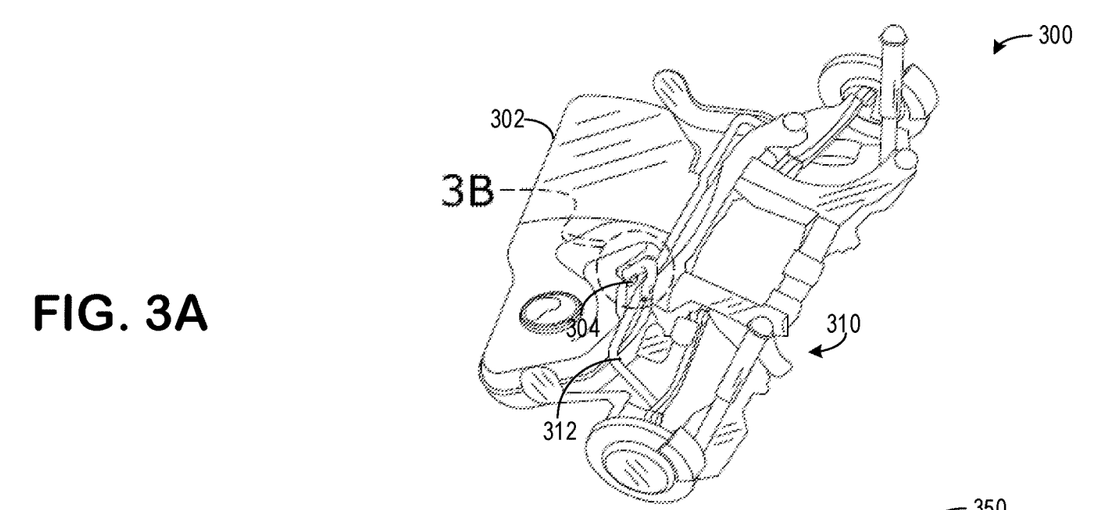
FIGS. 3A and 3B show a gap between the stability bar and the spud.
Figure 3B:
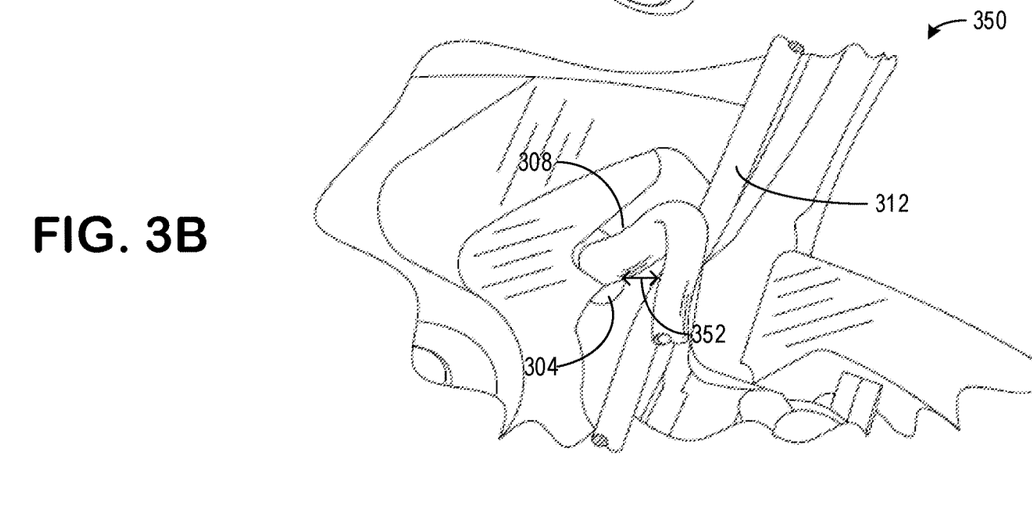

Turning now to FIG. 3A, it shows an arrangement 300 of a fuel tank 302 being arranged adjacent to a stability bar 312 of a suspension system 310. A close-up 350 of FIG. 3B illustrates a zoomed-in view of the arrangement 300, illustrating a proximity of the spud 304 to the stability bar 312 in greater detail. The FIGS. 3A and 3B may be described in tandem herein. Fuel tank 302, spud 304, suspension system 310, and stability bar 312 may be used similarly to fuel tank 202, spud 204, suspension system 210, and stability bar 212 of FIGS. 2A and 2B, respectively.

In some examples, it may be desired to maintain a threshold distance 352 between the stability bar 312 and the spud 304. In some embodiments, the threshold distance 352 may be between 10 to 100 mm. In some embodiments, additionally or alternatively, the threshold distance 352 may be between 20 to 70 mm. In some embodiments, additionally or alternatively, the threshold distance 352 may be between 30 to 50 mm. In one example, the threshold distance 352 is exactly 30 mm. The threshold distance 352 may be greater than at least 30 mm in some embodiments.

Turning now to FIG. 4, it shows an embodiment 400 of the vehicle 5 comprising the engine 10. A front end 492 of the vehicle 5 may house the engine. The front end 492 may correspond to an end of the vehicle in which a vehicle operator sees while driving. A rear end 494, opposite the front end 492, may comprise a tailpipe 448 configured to emit emissions from an exhaust passage (e.g., exhaust passage 148) to an ambient atmosphere. The fuel tank 402 and the suspension system 410 may be used similarly to the fuel tank 202 and suspension system 210 of FIG. 2A and/or to the fuel tank 302 and suspension system 310 of FIG. 3A without departing from the scope of the present disclosure. The front end 492 may comprise an extreme front end. The rear end 494 may comprise an extreme rear end.

Dashed line 496, which may be parallel to a vertical direction and perpendicular to a direction of vehicle locomotion, may represent a mid-way point between the front end 492 and the rear end 494. In one example, the dashed line 496 is exactly the middle point between the front end 492 and the rear end 494. Herein, dashed line 496 may be referred to as mid-way 496.

The fuel tank 402 may be arranged between the front end 492 and the rear end 494 adjacent the mid-way 496. In some examples, the fuel tank 402 may be arranged between the wheels 55 such that at least a portion of the fuel tank 402 overlaps with the mid-way 496. That is to say, the vehicle 5 may comprise four wheels 55, comprising two front wheels and two rear wheels. The two front wheels may be biased toward the front end 492 and the two rear wheels may be biased toward the rear end 494. The fuel tank 402 may be arranged between the front and rear wheels. In some examples, additionally or alternatively, the fuel tank 402 may be biased to either the front end 492 or the rear end 494. In such an example, where the fuel tank 402 is biased toward either the front end 492 or the rear end 494, a portion of the fuel tank 402 may overlap with the mid-way 496. In one example, the fuel tank 402 is arranged in a vehicle underbody directly below a passenger compartment, wherein the passenger compartment may include seating for passengers.

The suspension system 410 may be arranged between the fuel tank 402 and the rear end 494. In some examples, the suspension system 410 may be arranged between the two rear wheels of the vehicle 5. As described above, the suspension system 410, including the stability bar 412, may be used to redirect and/or absorb forces imparted by the wheels 55. As an example, the stability bar 412 may redistribute forces of the vehicle 5 through a turn such that weight is evenly distributed between the outer and inner wheels of the turn, relative to an apex of the turn.

An arrangement of the fuel tank 402 and the suspension system 410 may include the spud 404 extending from the fuel tank 402 toward the suspension system 410. Additionally, the stability bar 412 may extend from the suspension system 410 toward the fuel tank 402. That is to say, the spud 404 may extend toward the rear end 494 and the stability bar 412 may extend toward the front end 492. Thus, the spud 404 and the stability bar 412 extend toward one another. In one example, the spud 404 and the stability bar 412 extend toward one another along a horizontal axis 498, where the vehicle 5 travels in a direction parallel to the horizontal axis 498.

A dampener 422 may be arranged between the spud 404 and the stability bar 412. Specifically, the dampener 422 may be arranged around the spud 404, such that the dampener fully surrounds the spud 404. The dampener 422 may maintain a distance (e.g., threshold distance 352 of FIG. 3B) between the spud 404 and the stability bar 412. The dampener will be described in greater detail below.

The dampener 422 may comprise one or more of a foam, flexible metal, plastic, woven metal, and the like. In one example, the dampener 422 is foam. The foam may be of a closed-cell or an open cell form. In some examples, if there is more than one dampener present, then each of the closed-cell and open cell forms of foam may be present in the vehicle 5. An example of an open cell form which may be used may include foam rubber. The closed-cell foam may be a syntactic foam, which comprises a plurality of hollow particles embedded in a material matrix. The spheres may comprise one or more of glass, ceramic, and polymers. The syntactic foam may be reshaped when heated such that it may take the characteristic form of a mold. For example, the syntactic foam may be heated to complement an outer shell of the fuel tank 402.

The dampener 422 may be configured such that it does not expand. However, the dampener 422 may contract as it absorbs a force, and then expand back to an original volume following an absence of the force. Thus, the dampener 422 may not expand to a volume greater than its original volume.

Cross-linking agents may be included in a foam-forming composition to enhance processing and foam stability. Cross-linking agents may be relatively small molecules containing 2 or 3 active hydrogen groups, and may be added in amounts from 0 to 25 parts per hundred parts polyol. Representative cross-linking agents that may be included in the reaction mixture include diethanolamine (DEOA), ethylene glycol (EG), diethylene glycol (DEG), triethylene glycol (TEG), propylene glycol (PG), dipropylene glycol (DPG), 1,4 butanediol (BDO), commercially available as Bayer AG DP1022 and R2580.

Optionally, other additives may be incorporated into the foam-forming composition. The optional additives include, but are not limited to, fire retardants, stabilizers, antimicrobial compounds, extenders, dyes, and pigments. Such additives may not have an effect on the properties of the final polyurethane foam. Additionally or alternatively, the foam may comprise one or more surfactants.

The polyurethane foams of the present disclosure may be prepared using a one shot or a pre-polymer method that are known to the art, and in which hydroxyl containing ingredients (polyols) and polyisocyanates may be combined in the presence of catalysts, blowing agents, foam stabilizers, flame retardants, pigments and extenders. Polyester based polyurethanes, polyether based polyurethanes, copolymer polyol based polyurethanes and mixtures of these substances may be used in making foams of varying density.

Low density foams may comprise densities below 1.0 pcf [16 kg/m$^3$], more specifically between 0.6 pcf to 0.9 pcf [(9.6 to 14.4 kg/m$^3$], and cell sizes in the range of 8 to 33 ppi [3.15 to 12.99 pores per cm].

The foam may be cut to various shapes to match the external configuration of the tank 402 and/or the suspension system 410. The foam may be cut or shaped into a series of blocks that may be stacked individually one on the other to fit into the tank and around fuel lines and other internal tank obstructions. The foam blocks optionally may have portions of foam material removed therefrom as desired to fit into the tank or minimize fuel the amount of foam mass within the tank.

In one example, the dampener is a closed cell, high density polypropylene (PP) foam. The dampener is produced by compression molding of expanded PP beads. The density of foam may range from 56-90 kg/m$^3$.

It will be appreciated that in either the examples of FIGS. 2A and 2B or the examples of FIGS. 3A and 3B, a spud extending from a fuel tank toward a stability bar of a suspension system may present certain complications. As described above, movement of the stability bar may result in degradation of one or more of a fuel tank and a hose extending from the spud. A dampener may be arranged within the vicinity of the spud, the dampener being configured to maintain a threshold distance between the spud and the stability bar of the suspensions system to mitigate any undesired contact between the two. The dampener may be further configured to minimally adjust suspension characteristics of the suspension system such that performance and drive quality are not reduced.

Turning now to FIG. 5A, it shows a first embodiment 500 comprising the fuel system 402, the spud 404, the suspension system 410, and the stability bar 412 of FIG. 4. Along the gap between the fuel tank 402 and the suspensions system 410, where the spud 404 and the stability bar 412 reside, there is the dampener 422. The dampener 422 may be a plurality of dampeners, wherein the dampeners are strategically arranged along portions of the fuel tank 402 where collisions with the stability bar 412 may occur. In the present example of FIG. 5A, there are exactly two dampeners of the dampener 422, herein described as first dampener 422A and second dampener 422B, wherein the dampeners are arranged at portions of the fuel tank 402 corresponding to the spud 404. As such, the fuel tank 402 in the embodiment 500 may comprise two of the spud 404 arranged near opposite ends of the fuel tank, between the fuel tank and the stability bar. As shown, the first dampener 422A and the second dampener 422B are spaced away from one another, wherein there are no dampeners between the first and second dampeners.

Turning now to FIG. 5B, it shows a close-up view 550 of dampener 422A being arranged along the gap between the fuel tank 402 and the suspension system 410. The dampener 422A may be arranged along a portion of the fuel tank 402 below the spud 404. The dampener 422A may comprise at least one cutout 522 corresponding to the stability bar 412. For example, the cutout 522 may be substantially C-shaped such that the stability bar 412 may completely extend therein. That is to say, the dampener 422 completely traverse the gap between the fuel tank 402 and the suspension system 410 such that it touches a surface of the fuel tank and the suspension system, while completely receiving the stability bar 412 in the cutout 522 such that the stability bar 412 is arranged within the cutout.

The first dampener 422A may be substantially identical to the second dampener 422B in size, shape, and function. Thus, both the first and second dampeners 422A and 422B may be block and/or cube shaped, and comprise a C-shaped cutout. The cutout may be other shapes without departing from the scope of the present disclosure, such shapes include V-, U-, and D-shaped. As shown, the cutout extends from a portion of the dampener adjacent the suspension system 410 to a portion physically touching the stability bar 412. Thus, the cutout may not contact the fuel tank 402.

Turning now to FIG. 6A, it shows a second embodiment 600, which is substantially similar to the embodiment 200. However, a difference between the embodiment 600 and the embodiment 200 is that first and second dampeners 422A, 422B are arranged between the fuel tank 202 and the suspension system 210. The dampeners may be physically coupled to an outer shell of the fuel tank 202 via one or more of welds, adhesives, fusions, and fasteners. Additionally, the first and second dampeners 422A and 422B may be further held in place via straps 602 of the fuel tank. In some examples, a number of dampeners may be equal to a number of straps. In one example, the number of dampeners is exactly equal to the number of straps. In the example of FIG. 6A, there are two straps, a first strap 602A and a second strap 602B. The first strap 602A may be associated with the first dampener 422A and the second strap 602B may be associated with the second dampener 422B.

The first dampener 422A may comprise a first cut-out 622A configured to allow the strap 602A to traverse an entire height of the dampener 422A. The second dampener 422B may comprise a second cut-out 622B configured to allow the strap 602B to traverse an entire height of the dampener 422B. The first and second dampeners 422A and 422B may further comprise cutouts for receiving a spud (e.g., spud 204 of FIG. 2A). The straps 602A and 602B may be spaced away from or touching surfaces of the dampeners 422A and 422B, respectively.

In the embodiment 600, the first 422A and second 422B dampeners may not touch the stability bar 212 when the vehicle is in a resting position and unmoving. However, as the vehicle moves or if an object collides with the vehicle, the dampeners may be contacted by the stability bar 212, wherein the dampeners may be configured to absorb a force of the stability bar such that the stability bar remains a threshold distance (e.g., threshold distance 352 of FIG. 3B) away from the spud.

In some examples, additionally or alternatively, the first and second dampeners 422A, 422B may comprise a second cutout for receiving the stability bar 212. Thus, the dampeners may comprise two separate cutouts, wherein first cutouts are configured to receive the straps and second cutouts are configured to receive the stability bar.

Turning now to FIG. 6B, it shows a third embodiment 650, which is substantially similar to the embodiment 600, except that a dampener 652 of the embodiment 650 is different than the first and second dampeners 422A and 422B of the embodiment 600. The dampener 652 may be a single, contiguous piece. Additionally, the dampener 652 may not comprise cutouts for receiving either the straps 602A and 602B or a stability bar (e.g., stability bar 212 of FIGS. 2A and 6A). As such, the dampener 652 may be shaped to be arranged between the fuel tank 202 and the straps 602A and 602B.

Specifically, the dampener 652 may be pyramid shaped, wherein a cross-section of the dampener 652 taken along an x-y plane is substantially triangular. Specifically, the cross-section taken along the x-y plane may comprise a right-triangle shape. The dampener 652 may be narrowest at a bottom portion, wherein a thickness of the dampener 652 increases in a vertical direction along the y-axis. As such, the dampener 652 may be thicker at a location corresponding to the spud 204. In one example, the dampener 652 is thickest at a region adjacent the hose 208 and the spud 204.

The dampener 652 may comprise a cutout for receiving the hose 208. As such, the dampener 652 may be configured to maintain a position of the hose 208 adjacent the dampener 652. In this way, the hose 208 may be permitted to move less at portions of the hose 208 arranged in the cutout of the dampener 652 than portions arranged outside of the dampener 652 adjacent the pipe 206.

Turning now to FIG. 7A, it shows an embodiment 700 of a fuel tank 702 and a suspension system 710. FIG. 7B shows an underside view 750 of the embodiment 700, wherein a hose 708 of the fuel tank 702 is further depicted. FIGS. 7A and 7B may be described in tandem herein. The fuel tank 702 and the suspension system 710 may be used similarly to the fuel tank 202 and suspension system 210 of FIG. 2A. Additionally or alternatively, the fuel tank 702 and the suspension system 710 may be used similarly to the fuel tanks and suspension systems of FIGS. 3A, 4, 5A, and 6A.

As shown, a stability bar 712 extends from the suspension system 710, toward the fuel tank 702 along the x-axis. First dampener 722A and second dampener 722B are arranged such that the dampeners 722 may be coupled to the suspension system 710. Specifically, each of the first dampener 722A and the second dampener 722B may be configured to couple to one or more surfaces of the suspension system 710 while further comprising a cutout and/or indentation configured to receive the stability bar 712. Specifically, the first dampener 722A may comprise a first cutout 724A, wherein the first cutout 724A is substantially cylindrical in shape and configured to receive the stability bar 712. Receiving the stability bar 712 may include the stability bar 712 residing within the first cutout 724A, wherein the stability bar 712 may be in contact with surfaces of the first dampener 722A. Additionally or alternatively, the stability bar 712 may not be in contact with surfaces of the first dampener 722A such that there are gaps and/or spaces between surfaces of the first dampener 722A and the stability bar 712. This may prevent the first dampener 722A from hindering a function (e.g., absorption of forces) of the stability bar 712.

The second dampener 722B may be substantially similar to the first dampener 722A. In one example, the second dampener 722B is exactly identical to the first dampener 722A. The dampeners 722 may be block shaped. However, the dampeners 722 may be other shapes, such as spherical, trigonal, and the like without departing from the scope of the present disclosure. The dampeners 722 may be used similarly to the dampeners 422 of FIGS. 4 and 5A. Additionally or alternatively, the dampeners 722 may be joined to form a single, contiguous piece similar to the dampener 622 of FIG. 6B.

As shown, the first dampener 722A and the second dampener 722B do not touch and are separated from one another. A location of the first and second dampeners 722A and 722B may correspond with a location of one or more spuds on the fuel tank 702. Thus, horizontal axes of one of the spuds and the first dampener 722A or second dampener 722B may be parallel and arranged in a shared x-y plane.

In this way, a stability bar of the suspension system may not collide with a spud or other component of the fuel tank. The technical effect of arranging the dampener only on portions of the fuel tank facing the suspension system is to decrease manufacturing costs while still preventing undesired degradation of the fuel tank. The dampener may be directly coupled to either the fuel tank or the suspension system. By doing this, the dampener may be fitted onto a variety of vehicle layouts with relative ease.

An embodiment of a system comprises a fuel tank arranged upstream of a suspension system relative to a direction of vehicle movement, wherein a stability bar of the suspension system extends in an upstream direction toward a spud of the fuel tank and a foam being coupled to only a portion of the fuel tank where the spud is arranged. A first example of the system further includes where the foam is a single piece. A second example of the system, optionally including the first example, further includes where the foam is one foam of a plurality of foams, wherein the plurality of foams comprises first and second identical foams comprising a block shape, the first foam being arranged at a first strap and the second foam being arranged at a second strap, and where the first or second strap is adjacent the spud. A third example of the system, optionally including the first and/or second examples, further includes where the foam maintains a threshold distance between the stability bar and the spud. A fourth example of the system, optionally including one or more of the first through third examples, further includes where the foam comprises a triangular cross-section. A fifth example of the system, optionally including one or more of the first through fourth examples, further includes where the foam comprises a cube shape. A sixth example of the system, optionally including one or more of the first through fifth examples, further includes where the foam comprises a low-density. A seventh example of the system, optionally including one or more of the first through sixth examples, further includes where the foam is open cell or closed cell. An eighth example of the system, optionally including one or more of the first through seventh examples, further includes where the foam is a syntactic foam. A ninth example of the system, optionally including one or more of the first through eighth examples, further includes where the foam comprises one or more cutouts for receiving a strap of the fuel tank, wherein the strap of the fuel tank traverses an entire height of the foam.

An embodiment of a vehicle underbody comprises a fuel tank arranged between front and rear wheels of a vehicle, a suspension system arranged proximally to the fuel tank and closer to the rear wheels than the fuel tank, wherein a stability bar of the suspension system extends toward a spud of the fuel tank, and a dampener arranged between the fuel tank and the suspension system, wherein the dampener comprises a cutout to receive the stability bar. A first example of the vehicle underbody further includes where the cutout extends into a body of the dampener, and where the stability bar is arranged within the cutout and is spaced away from surfaces of the stability bar. A second example of the vehicle underbody, optionally including the first example, further includes where the dampener is physically coupled to only a portion of the fuel tank where the spud is arranged. A third example of the vehicle underbody, optionally including the first and/or second examples, further includes where the dampener is physically coupled to the suspension system, and where a portion of the dampener overlaps with a horizontal axis extending from the spud, wherein the horizontal axis is parallel to a direction of vehicle movement. A fourth example of the vehicle underbody, optionally including one or more of the first through third examples, further includes where a portion of the fuel tank overlaps with a central axis of a vehicle, wherein the central axis is arranged exactly between a front extreme end and a rear extreme end of the vehicle.

An embodiment of a system comprises a fuel tank arranged directly below a passenger compartment, a suspension system arranged nearer to a rear end of a vehicle than the fuel tank, wherein a spud of the fuel tank extends from the fuel tank toward a stability bar of the suspension system, and a dampener arranged between only the spud and the stability bar, the dampener configured to maintain a threshold distance between the spud and the stability bar. A first example of the system further includes where the threshold distance is between 10-50 mm, and where the threshold distance measures a horizontal distance between the stability bar and the spud. A second example of the system, optionally including the first example, further includes where the spud and the stability bar are vertically aligned and share a horizontal axis. A third example of the system, optionally including the first and/or second examples, further includes where the spud and the stability bar are vertically offset, where a spud horizontal axis is parallel to a stability bar horizontal axis. A fourth example of the system, optionally including one or more of the first through third examples, further includes where the spud is arranged vertically higher than the stability bar.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a fuel tank arranged upstream of a suspension system relative to a direction of vehicle movement, wherein a stability bar of the suspension system extends in an upstream direction toward a spud of the fuel tank coupled to a pipe; and
   at least one foam being coupled to only a portion of the fuel tank including where the spud is arranged.

2. The system of claim 1, wherein the at least one foam is a single piece.

3. The system of claim 1, wherein the at least one foam includes a plurality of foam, wherein the plurality of foam comprises first and second identical foams comprising a block shape, the first foam being arranged at a first strap and the second foam being arranged at a second strap, and where the first or second strap is adjacent the spud.

4. The system of claim 1, wherein the at least one foam maintains a threshold distance between the stability bar and the spud.

5. The system of claim 1, wherein the at least one foam comprises a triangular cross-section.

6. The system of claim 1, wherein the at least one foam comprises a cube shape.

7. The system of claim 1, wherein the at least one foam comprises a low-density or a high-density.

8. The system of claim 1, wherein the at least one foam is open cell or closed cell.

9. The system of claim 1, wherein the at least one foam is a syntactic foam.

10. The system of claim 1, wherein the at least one foam comprises one or more cutouts for receiving a strap of the fuel tank, wherein the strap of the fuel tank traverses an entire height of the foam.

11. A vehicle underbody, comprising:
    a fuel tank arranged between front and rear wheels of a vehicle;
    a suspension system arranged proximally to the fuel tank and closer to the rear wheels than the fuel tank, wherein a stability bar of the suspension system extends toward a spud of the fuel tank, the spud fluidly coupled to a hose leading to a fuel supply pipe; and
    a dampener arranged between the fuel tank and the suspension system, wherein the dampener comprises a cutout to receive the stability bar.

12. The vehicle underbody of claim 11, wherein the cutout extends into a body of the dampener, and where the stability bar is arranged within the cutout and is spaced away from surfaces of the body of the dampener.

13. The vehicle underbody of claim 11, wherein the dampener is physically coupled to only a portion of the fuel tank where the spud is arranged.

14. The vehicle underbody of claim 11, wherein the dampener is physically coupled to the suspension system, and where a portion of the dampener overlaps with a horizontal axis extending from the spud, wherein the horizontal axis is parallel to a direction of vehicle movement.

15. The vehicle underbody of claim 11, wherein a portion of the fuel tank overlaps with a central axis of the vehicle, wherein the central axis is arranged exactly between a front extreme end and a rear extreme end of the vehicle.

16. A system, comprising:
    a fuel tank arranged directly below a passenger compartment;
    a suspension system arranged nearer to a rear end of a vehicle than the fuel tank, wherein a spud of the fuel tank extends from the fuel tank toward a stability bar of the suspension system; and
    a dampener arranged between only the spud and the stability bar, the dampener configured to maintain a threshold distance between the spud and the stability bar.

17. The system of claim 16, wherein the threshold distance is between 10-50 mm, and where the threshold distance measures a horizontal distance between the stability bar and the spud.

18. The system of claim 16, wherein the spud and the stability bar are vertically aligned and share a horizontal axis.

19. The system of claim 16, where the spud and the stability bar are vertically offset, where a spud horizontal axis is parallel to a stability bar horizontal axis.

20. The system of claim 19, wherein the spud is arranged vertically higher than the stability bar.

* * * * *